US006967570B2

(12) United States Patent
Tsuji et al.

(10) Patent No.: US 6,967,570 B2
(45) Date of Patent: Nov. 22, 2005

(54) ID REGISTRATION METHOD FOR TIRE AIR PRESSURE SENSOR, ID REGISTRATION SYSTEM, TIRE AIR PRESSURE MONITORING SYSTEM, TIRE AIR PRESSURE SENSOR, AND SMART CONTROL SYSTEM

(75) Inventors: Hiroyuki Tsuji, Anjo (JP); Ryozo Okumura, Kariya (JP)

(73) Assignee: Denso Corporation, Kariya (JP)

( * ) Notice: Subject to any disclaimer, the term of this patent is extended or adjusted under 35 U.S.C. 154(b) by 7 days.

(21) Appl. No.: 10/626,721

(22) Filed: Jul. 25, 2003

(65) Prior Publication Data

US 2005/0017860 A1    Jan. 27, 2005

(30) Foreign Application Priority Data

Jul. 31, 2002    (JP) ............................ 2002-223998

(51) Int. Cl.[7] ............................................. B60C 23/02
(52) U.S. Cl. ...................... 340/442; 340/444; 340/445; 340/446; 340/447; 340/448; 116/134 R
(58) Field of Search ................................ 340/442, 444, 340/445, 447, 825.69, 825.72, 446, 448, 340/426.13, 426.15; 73/146, 146.2, 146.5, 73/146.7, 146.8; 116/134 R

(56) References Cited

U.S. PATENT DOCUMENTS

| 5,463,374 A | * | 10/1995 | Mendez et al. ............. 340/442 |
| 5,602,524 A | | 2/1997 | Mock et al. |
| 5,924,055 A | * | 7/1999 | Hattori ....................... 702/138 |
| 6,112,585 A | | 9/2000 | Schrottle et al. |
| 6,542,077 B2 | * | 4/2003 | Joao ....................... 340/426.16 |
| 6,597,284 B2 | * | 7/2003 | Juzswik ...................... 340/442 |
| 6,745,624 B2 | * | 6/2004 | Porter et al. ............... 73/146.2 |

FOREIGN PATENT DOCUMENTS

| JP | 2001-80321 | 3/2001 |
| JP | 3212311 | 7/2001 |
| JP | A-2001-322411 | 11/2001 |
| JP | A-2004-009923 | 1/2004 |

* cited by examiner

*Primary Examiner*—Hung Nguyen
(74) *Attorney, Agent, or Firm*—Posz Law Group, PLC

(57) ABSTRACT

Provided is a tire air pressure monitoring system in which identification ("ID") registration is automatically made while specifying a tire position to reduce the manpower of the registration operation and further to prevent mistaken registration. In this system, when an ignition switch is changed from an OFF state to an ON state to satisfy a tire position detection condition, a command is issued to a smart control unit so that a transmitter transmits an ID transmission request to an air pressure sensor, and the air pressure sensor returns ID data as a reply to the ID transmission request. The ID data received is collated with a previously registered ID and, if the result of the collation shows that the ID data pertains to the air pressure sensor of his/her own vehicle, the received ID data is registered as an ID related to a specific tire position.

43 Claims, 11 Drawing Sheets

ID REGISTRATION METHOD FOR TIRE AIR PRESSURE SENSOR, ID REGISTRATION SYSTEM, TIRE AIR PRESSURE MONITORING SYSTEM, TIRE AIR PRESSURE SENSOR, AND SMART CONTROL SYSTEM

BACKGROUND OF THE INVENTION

1) Field of the Invention

The present invention relates to an identification ("ID") registration method for a tire air pressure sensor, an ID registration system, tire air pressure monitoring system, a tire air pressure sensor and a smart control system.

2) Description of the Related Art

So far, as a tire air-pressure monitoring system, there has known a technique disclosed in Japanese patent No. 3212311.

This conventional tire air pressure monitoring system is designed such that an air pressure sensor is mounted on each of tires and an air pressure detection signal, together with a sensor identification ("ID") (identification information, identification means), is transmitted from the air pressure sensor and then received by a tire pressure monitoring apparatus mounted on a vehicle body side so that, when there exists at least one tire unusual in air pressure, an indication appears on an indicator to issue an alarm.

In this system, the ID for each sensor is registered (stored in a state registered) in a memory of the tire pressure monitoring apparatus, and this ID is collated with the sensor ID included in the received data so that a decision is made as to whether or not the received detection signal is from an air pressure sensor of a tire of this (his/her own) vehicle.

This sensor ID is allocated to each air pressure sensor by a sensor maker at the stage of shipping, while in a car maker, in assembling a vehicle, a tire pressure monitoring apparatus of a vehicle body is set into an ID registration mode and the air pressure sensors are operated one by one in a predetermined order (sequence) to transmit their own sensor IDs so that the tire air pressure monitoring apparatus receives IDs transmitted therefrom in this way for registering them in its own memory. Thus, the ID registration is done in a manner such that the identification on the tire positions can be made on the basis of the order of ID registration.

However, since a vehicle undergoes the tire rotation at an interval of a predetermined traveling distance, if the contents of the ID registration are not updated, difficulty is encountered in informing a driver of the position of a tire in which the abnormality of air pressure occurs. In particular, in the case of the vehicle, since the occurrence of the air pressure abnormality in the front-wheel side exerts influence on the steering performance, from the viewpoint of the improvement of safety, the information as to whether the tire involved in air pressure abnormality belongs to the front wheel side or to the rear wheel side is required for the driver.

Accordingly, in maintenance shops or the like, after the implementation of the rotation, there is a need to again place the tire air pressure monitoring apparatus into the ID registration mode and to make the air pressure sensors transmit their own sensor IDs in the predetermined order for the ID registration. This makes the registration troublesome and can cause mistaken registration.

SUMMARY OF THE INVENTION

It is therefore a first object of the present invention to reduce the manpower needed for an operation through which an identification ("ID") of an air pressure sensor required for the ID collation in a tire air pressure monitoring system is registered so that the tire positions are identifiable.

A second object of the invention is to achieve the first object thereof without using a new device additionally.

A third object of the invention is to, when the ID registration is made so that the tire positions are identifiable, prevent the ID registration from being done in error due to the interference with data transmitted from an air pressure sensor on a tire of another vehicle.

A fourth object of the invention is to prevent the registration from being done in a state where the tire position is in error due to the interference with data transmitted from an air pressure sensor on a different tire of his/her own vehicle.

A fifth object of the invention is to prevent an indication from being made in error on the basis of registration information before the implementation of rotation at tire air pressure monitoring processing.

A sixth object of the invention is to automate the ID registration operation, whereby the aforesaid first to fifth objects are achievable, as much as possible.

A seventh object of the invention is to further automate the ID registration operation which achieves the aforesaid first to fifth objects.

For achieving the aforesaid first object of the present invention, in accordance with an aspect of the present invention, there is provided a sensor ID registration method of registering (putting) an ID of an air pressure sensor mounted on each of tires of a vehicle in a memory in a state where the position of the tire is identifiable, with the air pressure sensor being equipped with a reception function and a plurality of transmitters being provided in a body of the vehicle, each of which places only one of the tires in its transmission area, the method comprising a transmission step in which one of the air pressure sensors transmits its own ID in response to an ID transmission request transmitted from one of the transmitters, a reception step in which a receiver of the vehicle body receives the ID transmitted in the transmission step, and a registration step in which the ID received in the reception step is registered in the memory while specifying a tire position in relation to the transmitter which has transmitted the ID transmission request.

In the tire air pressure sensor ID registration method according to the present invention, when one transmitter transmits an ID transmission request in the transmission step, an air pressure sensor of a tire existing in the transmission area of this transmitter makes a reply thereto. Since the other tires do not reside in the transmission area, the ID received in the reception step is identical with the ID from the air pressure sensor existing in the transmission area of the transmitter which has transmitted the ID transmission request in the transmission step. Therefore, if, in the registration step, the ID received in the reception step is registered in a memory in accordance with the relationship to the transmitter which has issued the ID transmission request in the transmission step, the ID of the air pressure sensor can be registered in the memory while specifying the tire position.

In addition, for achieving the aforesaid object of the invention, in accordance with another aspect of the invention, there is provided a sensor ID registration method of registering an ID of an air pressure sensor mounted on each of tires of a vehicle in a memory in a state where the position of the tire is identifiable, with the air pressure sensor being equipped with a reception function, the method comprising a transmission step in which an ID transmission request is transmitted from one of transmitters placed on doors of the vehicle for smart control so that one of the air pressure sensors transmits its own ID, a reception step in which a receiver of a vehicle body receives the ID transmitted in the transmission step, and a registration step in which the ID received in the reception step is registered in the memory while specifying the position of the tire in relation to the transmitter which has transmitted the ID transmission request.

Each of the transmitters placed on each of the doors of the vehicle for the smart control is designed to make transmission to only a limited area around each of the doors. This signifies that each of the transmitters for the smart control places (covers) only one of the tires of the vehicle in its transmission area. Accordingly, as in the case of the above-described the sensor ID registration method according to the present invention, the air pressure sensor ID can be registered in the memory while specifying the position of the tire. According to this method, because of the utilization of the transmitters provided for the smart control, there is no need to use new equipment additionally. Therefore, this method can achieve not only the first object but also the second object.

In the above-described air pressure sensor ID registration methods according to the present invention, each of the above-mentioned steps is repeatedly implemented while the transmitters are rotated (shifted) to transmit the ID transmission requests in turn so that the IDs related to all the tires are registered in the memory, thus registering the IDs of the air pressure sensors of all the tires while specifying the tire positions. Accordingly, in the ID registration operation after the implementation of the rotation, the air pressure sensor ID registration can correctly be made in a manner such that the transmitters are operated one by one to transmit the ID transmission request by turns and, hence, there is no need for an operator to operate air pressure sensors in the predetermined order (sequence).

Still additionally, for achieving the above-mentioned third object of the prevent invention, in the above-described air pressure sensor ID registration method, the IDs of the air pressure sensors of the tires of his/her own vehicle are registered in the memory in advance and the ID received from the air pressure sensor in response to the ID transmission request is collated with the registration contents in the memory to confirm that the received ID pertains to the air pressure sensor of the tire of his/her own vehicle and, if it is confirmed, the ID registration is carried out in a state where the tire position is specified.

In this way, even in a case in which, at the ID registration, an ID transmitted from an air pressure sensor of a tire of another vehicle accidentally encounters the processing timing, it is possible to solve a problem of mistaken registration stemming from the interference.

Yet additionally, for achieving the aforesaid fourth object of the invention, in the air pressure sensor ID registration method, the air pressure sensor is made to transmit its own ID in a manner that involves identifying a reply made with respect to the ID transmission request.

Although the air pressure sensor usually carries out the operation to transmit an ID and air pressure detection data, it is also appropriate that the air pressure sensor transmits data with a structure whereby the fact that it is a reply made with respect to an ID transmission request is identifiable, for example, the air pressure sensor, when an ID transmission request takes place, transmits only an ID or data obtained by adding a specific bit to the normal data. In this case, even if not only an air pressure sensor of another vehicle but also an air pressure sensor of his/her own vehicle accidentally encounter a normal transmission timing, the normal data and the reply to the ID transmission request are distinguishable from each other. Thus, this can prevent not only the mistaken registration due to the interference with data transmitted from another vehicle but also the mistaken registration stemming from the interference with data transmitted from an air pressure sensor of another tire of his/her own vehicle.

Moreover, for achieving the aforesaid fifth object of the invention, in the above-described air pressure sensor ID registration method, it is also appropriate that, when an ID is already registered in the memory in the form of specifying the tire position, the ID registration is made by overwriting the already registered information. This securely prevents the mistaken indication from occurring in the air pressure monitoring processing in the tire air pressure monitoring system due to the presence of both the already registered ID information and newly registered ID information.

Still moreover, for achieving the aforesaid sixth object of the invention, in the above-described air pressure sensor ID registration method, it is also appropriate that each of the above-mentioned steps is implemented in response to a predetermined trigger.

For example, as the trigger, there is employed a switch signal generated by manipulating a predetermined switch or a timer interrupt signal for implementing the ID registration method at a fixed interval. Even the switch manipulation can considerably reduce the manpower as compared to the conventional operation of IDs being transmitted from air pressure sensors in predetermined order in a state switched into the ID registration mode. In the case of the timer interruption, it is possible to extremely promote the automation on the ID registration.

Yet moreover, for achieving the seventh object of the invention, in the above-described air pressure sensor ID registration method, it is also appropriate that each of the above-mentioned steps is implemented when an ignition switch shows a variation in state.

For example, each of the above-mentioned steps for the ID registration is implemented when the ignition switch is changed from an OFF state to an ON state, and vise versa (from an ON state to an OFF state), or each of the above-mentioned steps for the ID registration is implemented when the ignition switch varies from one of an OFF state, an ACCESSARY state and an ON state to a different state. In a case in which each of the steps for the ID registration is implemented in accordance with a state variation of the ignition switch, it is possible to eliminate the need for an operator to conduct a special operation for the ID re-registration after the implementation of rotation, and the ID registration method according to the present invention is automatically implemented during a time period from the engine start for moving the vehicle to the engine stop after the rotation. In this connection, in a case in which each of the above-mentioned steps for the ID registration is implemented when the ignition switch is changed from an OFF state to an ON state, the latest ID registration is implemented when the vehicle runs actually and it is most preferable, besides the production of a software program becomes easy.

Furthermore, for achieving the aforesaid first object of the invention, in accordance with a further aspect of the invention, there is provided a tire air pressure sensor ID registration system which is made to register an ID of an air pressure sensor mounted on each of tires of a vehicle in a memory in a state where the position of the tire is identifiable, with the air pressure sensor being equipped with a reception function, the system comprising a plurality of transmitters provided in a vehicle body, each of which places only one of the tires in its transmission area, a receiver provided in the vehicle body for receiving the ID transmitted from the air pressure sensor, transmitter operating means for making one of the transmitters transmit an ID transmission request, and ID registration means for registering the ID received by the receiver in the memory while specifying the position of the tire on the basis of the relationship with the transmitter put into operation by the transmitter operating means. This ID registration system operates the transmitter operating means to automatically implement the ID registration specifying the tire position.

Still furthermore, for achieving the aforesaid second object of the invention, in accordance with a further aspect of the invention, there is provided a tire air pressure sensor ID registration system which is made to register an ID of an air pressure sensor mounted on each of tires of a vehicle in a memory in a state where the position of the tire is identifiable, with the air pressure sensor being equipped with a reception function, the system comprising smart control transmitters provided on doors of the vehicle, a receiver provided in a vehicle body for receiving the ID transmitted from the air pressure sensor, transmitter operating means for making one of the transmitters transmit an ID transmission request, and ID registration means for registering the ID received by the receiver in the memory while specifying the position of the tire on the basis of the relationship with the transmitter put into operation by the transmitter operating means. With this system, the transmitters for the smart control are also used as transmitters for the sensor ID registration in a tire air pressure monitoring system, which suppresses the additional employment of equipment.

In this tire air pressure sensor ID registration system, the transmitter operating means is constructed as means for making the next transmitter transmit an ID transmission request when the ID registration for one air pressure sensor in the ID registration means reaches completion, and the ID registration means is constructed as means for implementing the ID registration whenever the transmitter operating means is put into activation. With this arrangement, the air pressure sensor IDs of all the tires can be registered in the memory while specifying the tire positions.

Yet furthermore, for achieving the aforesaid third object of the invention, in the above-described tire air pressure sensor ID registration system according to the invention, the IDs of the air pressure sensors of the tires of his/her own vehicle are registered in the memory in advance, and the system further comprises ID collation means for collating the ID received from the air pressure sensor in response to the ID transmission request with the registration contents in the memory to confirm the fact that the received ID is an ID of an air pressure sensor of a tire of his/her own vehicle, and the ID registration means implements the ID registration when the ID collation means confirms that the received ID is the air pressure sensor ID of the tire of his/her own vehicle.

In addition, for achieving the aforesaid fourth object of the invention, in the above-described tire air pressure sensor ID registration system according to the present invention, the air pressure sensor includes registration ID transmission means for transmitting its own ID in a manner that involves identifying a reply made with respect to an ID transmission request.

Still additionally, for achieving the aforesaid fifth object of the invention, in the above-described tire air pressure sensor ID registration system according to the invention, the ID registration means is constructed as means for overwriting the already registered information when an ID specifying a tire position is in a state registered.

Yet additionally, for achieving the aforesaid sixth object of the invention, in the above-described tire air pressure sensor ID registration system according to the invention, the transmitter operating means is put into activation in response to a predetermined trigger.

Yet additionally, for achieving the aforesaid seventh object of the invention, in the above-described tire air pressure sensor ID registration system according to the invention, the transmitter operating means is put into activation when an ignition switch shows a state variation.

Moreover, for achieving the aforesaid first object of the invention, in accordance with a further aspect of the invention, there is provided a tire air pressure monitoring system in which a receiver receives air pressure detection data and ID transmitted from an air pressure sensor mounted on each of tires of a vehicle and a control unit collates the ID with the registration contents in a memory to specify the tire air pressure sensor of his/her own vehicle the data pertains to and, when detecting a tire which shows abnormality in air pressure, makes an alarm indication on the specified tire, with the air pressure sensors being equipped with a reception function, the monitoring system comprising a plurality of transmitters provided in a vehicle body, each of which places only one of the tires in its transmission area, transmitter operating means for making one of the transmitters transmit an ID transmission request, and ID registration means for registering the ID received by the receiver in the memory while specifying the tire position on the basis of the relationship with the transmitter put into activation by the transmitter operating means.

Still moreover, for achieving the second object of the invention, in accordance with a further aspect of the invention, there is provided a tire air pressure monitoring system in which a receiver receives air pressure detection data and ID transmitted from an air pressure sensor mounted on each of tires of a vehicle and a control unit collates the ID with the registration contents in a memory to specify the tire air pressure sensor of his/her own vehicle the data pertains to and, when detecting a tire which shows abnormality in air pressure, makes an alarm indication on the specified tire, with the air pressure sensors being equipped with a reception function, the monitoring system comprising transmitters placed on doors of the vehicle for smart control, a receiver for receiving the ID transmitted from the air pressure sensor, transmitter operating means for making one of the transmitters transmit an ID transmission request, and ID registration means for registering the ID received by the receiver in the memory while specifying the tire position on the basis of the relationship with the transmitter put into activation by the transmitter operating means.

In the tire air pressure monitoring system according to the present invention utilizing the exterior-side transmitters of the vehicle for the smart control, the transmitter operating means includes operation command outputting means for outputting a predetermined command designating a transmitter to be operated with respect to a smart control system for controlling the transmitters, and is constructed as means for making the transmission of the ID transmission request by outputting the predetermined command to the smart control system through the use of the operation command outputting means. Thus, because of controlling the transmitters of the vehicle through the smart control system, an advantage exists in that there is no need for the tire air pressure monitoring system to hold data for controlling the exterior-side transmitters themselves. Incidentally, for vehicles, there has been known a technique in which communications are made through an in-vehicle LAN between various types of electronic control computers. Accordingly, this tire air pressure monitoring system is easily realizable through the use of this in-vehicle LAN.

In this tire air pressure monitoring system, it is also appropriate that the transmitter operating means is constructed as means for, when the ID registration for one air pressure sensor in the ID registration means reaches completion, making the next transmitter transmit an ID transmission request, and the ID registration means is constructed as means for implementing the ID registration whenever the transmitter operating means is put into activation, thereby enabling the registration of the IDs of the air pressure sensors of all tires in the memory while specifying the tires.

Yet moreover, for achieving the aforesaid third object of the invention, in the above-described tire air pressure monitoring system, an ID of an air pressure sensor of each of tires of his/her own vehicle is registered in the memory in advance, and the system further comprises an ID collation means for collating the ID received from the air pressure sensor in response to the ID transmission request with the registration contents in the memory to confirm the fact that the received ID is an ID of an air pressure sensor of a tire of his/her own vehicle, and the ID registration means implements the ID registration when ID collation means confirms that the received ID is the air pressure sensor ID of the tire of his/her own vehicle.

In addition, for achieving the aforesaid fourth object of the invention, in the above-described tire air pressure monitoring system, the air pressure sensor includes registration ID transmission means for transmitting its own ID so that the fact that it is a reply made with respect to an ID transmission request is identifiable.

Still additionally, for achieving the aforesaid fifth object of the invention, in the above-described tire air pressure monitoring system, it is also appropriate that the ID registration means is constructed as means for, when an ID is already registered in the memory in the form of specifying the tire position, making the ID registration by overwriting the already registered information.

Yet additionally, for achieving the aforesaid sixth object of the invention, in the above-described tire air pressure monitoring system, it is also appropriate that the transmitter operating means is put into activation in response to a predetermined trigger.

Yet additionally, for achieving the aforesaid seventh object of the invention, in the above-described tire air pressure monitoring system, it is also appropriate that the transmitter operating means is put into activation when an ignition switch shows a state variation.

Furthermore, for achieving the above-mentioned objects of the invention, in accordance with a further aspect of the invention, there is provided a tire air pressure sensor comprising reception means and ID transmission means for transmitting its own ID in a different communication format or different data form from that at transmission of normal detection data when the reception means receives a predetermined ID transmission request signal.

Still furthermore, for achieving the above-mentioned fourth object of the invention, in accordance with a further aspect of the invention, there is provided a tire air pressure sensor comprising reception means and ID transmission means for, when the reception means receives a predetermined ID transmission request signal, transmitting its own ID enabling the identification of a reply to the ID transmission request.

Moreover, for achieving the above-mentioned second object of the invention, in accordance with a further aspect of the invention, there is provided a smart control system comprising command reception decision means made to receive a command from a tire air pressure monitoring system for making a decision as to whether a command to the effect that one of exterior-side transmitters of a vehicle outputs a predetermined signal to an air pressure sensor constituting a tire air pressure monitoring system for making a request for transmission of an ID is received or not, signal outputting transmitter decision means for, when the command reception decision means makes a decision indicative of the reception of the command, making a decision on which of the exterior-side transmitters is indicated by the received command to transmit an ID transmission request, and ID transmission request outputting means for, on the basis of a result of the decision in the signal outputting transmitter decision means, making one of the exterior-side transmitters transmit an ID transmission request.

BRIEF DESCRIPTION OF THE DRAWINGS

Other objects and features of the present invention will become more readily apparent from the following detailed description of the preferred embodiments taken in conjunction with the accompanying drawings in which.

DESCRIPTION OF THE PREFERRED EMBODIMENTS

Figure 1:
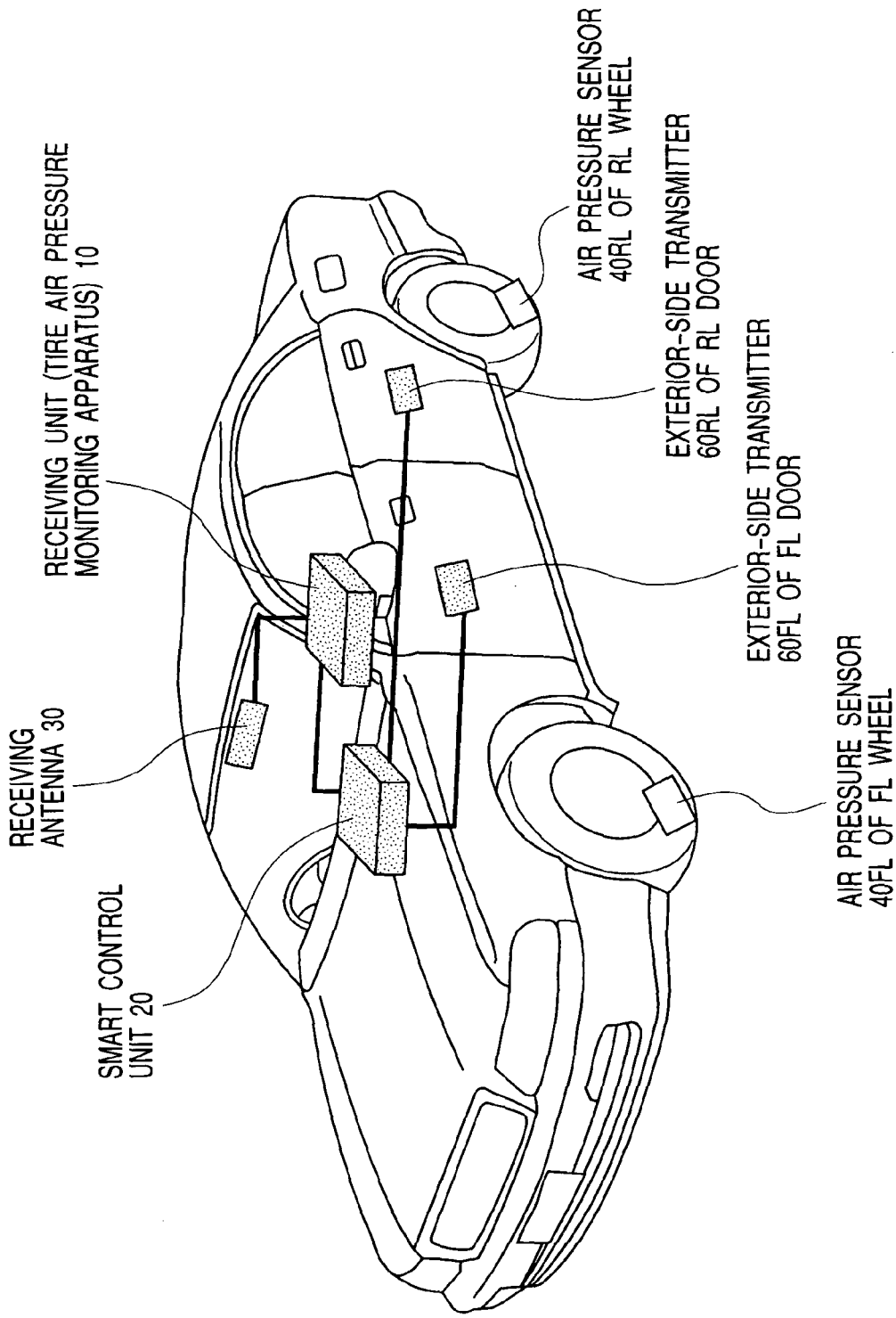
FIG. 1 is an illustrative view showing a vehicle equipped with a tire air pressure monitoring system and a smart control system according to a first embodiment of the present invention.

An embodiment of the present invention will be described hereinbelow with reference to the drawings. FIG. 1 is an illustrative view showing a vehicle equipped with a tire air pressure monitoring system and a smart control system according to a first embodiment of the present invention. In FIG. 1, in addition to a tire air pressure monitoring system according to the first embodiment, the vehicle includes a smart control function. The smart control is a kind of keyless entry system for locking/unlocking a door(s) through the use of an electronic key. In particular, it is made to transmit a request signal to the electronic key and receive a reply thereto for the key collation so that the door locking/unlocking can be achieved in a state where a user is putting the electronic key in his/her pocket.

Therefore, as shown in FIG. 1, the vehicle according to this embodiment is equipped with a receiving unit 10 for a tire air pressure monitoring system and a smart control unit 20 for the smart control. The receiving unit 10 has a reception antenna 30 for both the tire air pressure monitoring system and the smart control.

Figure 2:
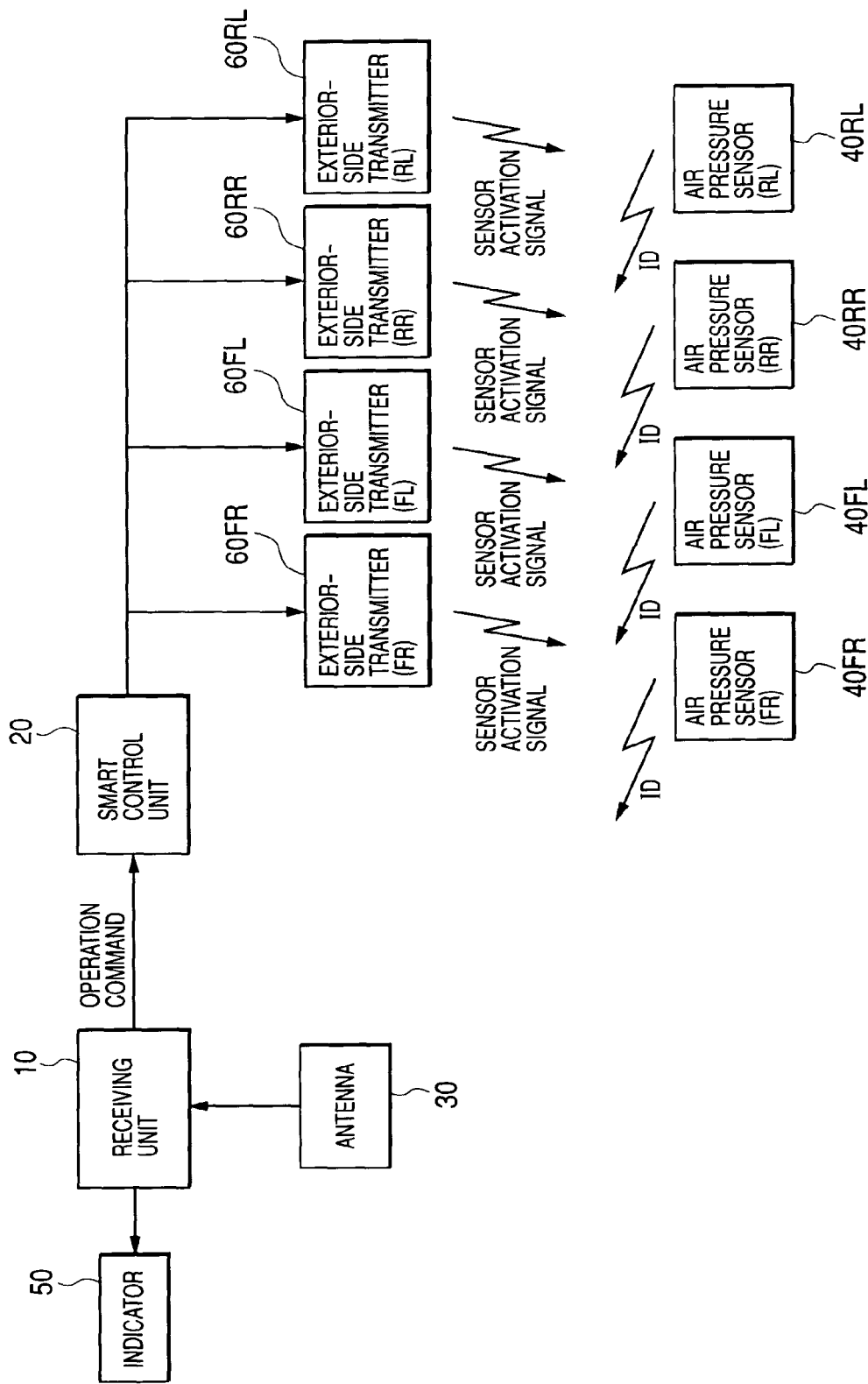
FIG. 2 is a block diagram showing configurations of the tire air pressure monitoring system and the smart control system according to the first embodiment.

In addition to the receiving unit 10, as shown in FIGS. 1 and 2, the tire air pressure monitoring system includes air pressure sensors 40FR, 40FL, 40 RR and 40RL mounted on tires of the vehicle and an indicator 50 for providing an indication on a result of the air pressure monitoring control in the receiving unit 10. Moreover, in this embodiment, for the control processing in the tire air pressure monitoring system, there are used exterior-side transmitters 60FR, 60FL, 60RR and 60RL mounted on the doors for transmitting a request signal from the smart control unit 20 to the exterior of the vehicle. Accordingly, as shown in FIG. 2, the receiving unit 10 is designed to transmit an exterior-side transmitter operating command to the smart control unit 20 for making the exterior-side transmitters 60FR, 60FL, 60RR and 60RL conduct a predetermined operation.

Figure 3:
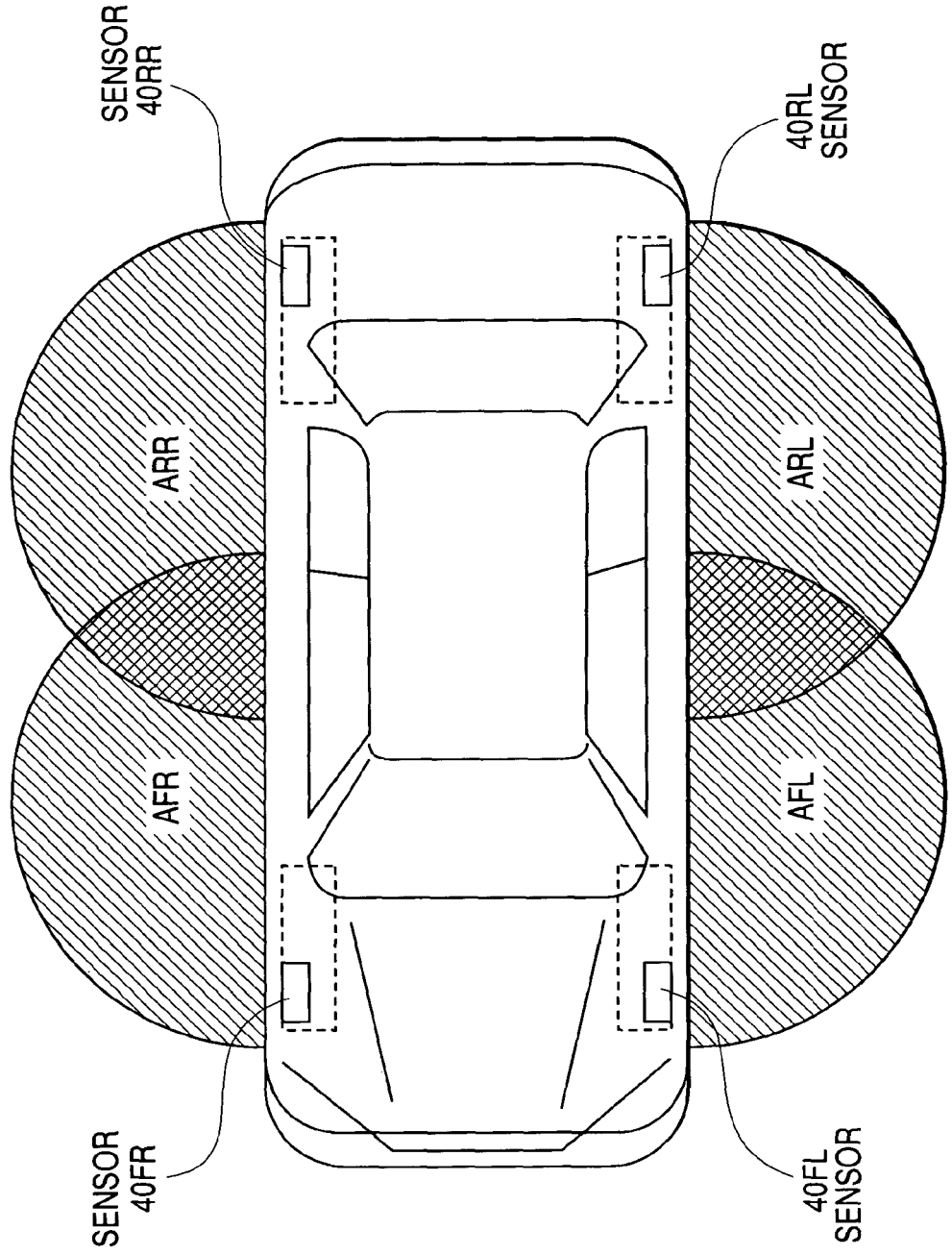
FIG. 3 is a plan view showing transmission areas of exterior-side transmitters for the smart control according to the first embodiment.

In this case, as shown in FIG. 3, each of the exterior-side transmitters 60FR, 60FL, 60RR and 60RL provided for the purpose of the smart control is made to be capable of transmitting a signal within each of limited areas AFR to ARR around the doors holding them. As seen from the illustration, only a tire of a front-left wheel resides within the transmission area AFL of the exterior-side transmitter 60FL located on a door for the front-left seat (FL seat). Likewise, only a tire of a rear-left wheel resides within the transmission area ARL of the exterior-side transmitter 60RL on a door for the rear-left seat (RL seat), and only a tire of a front-right wheel resides within the transmission area AFR of the exterior-side transmitter 60FR on a door for the front-right seat (FR seat), and further only a tire of a rear-right wheel resides within the transmission area ARR of the exterior-side transmitter 60RR on a door for the rear-right seat (RR seat).

Figure 4:
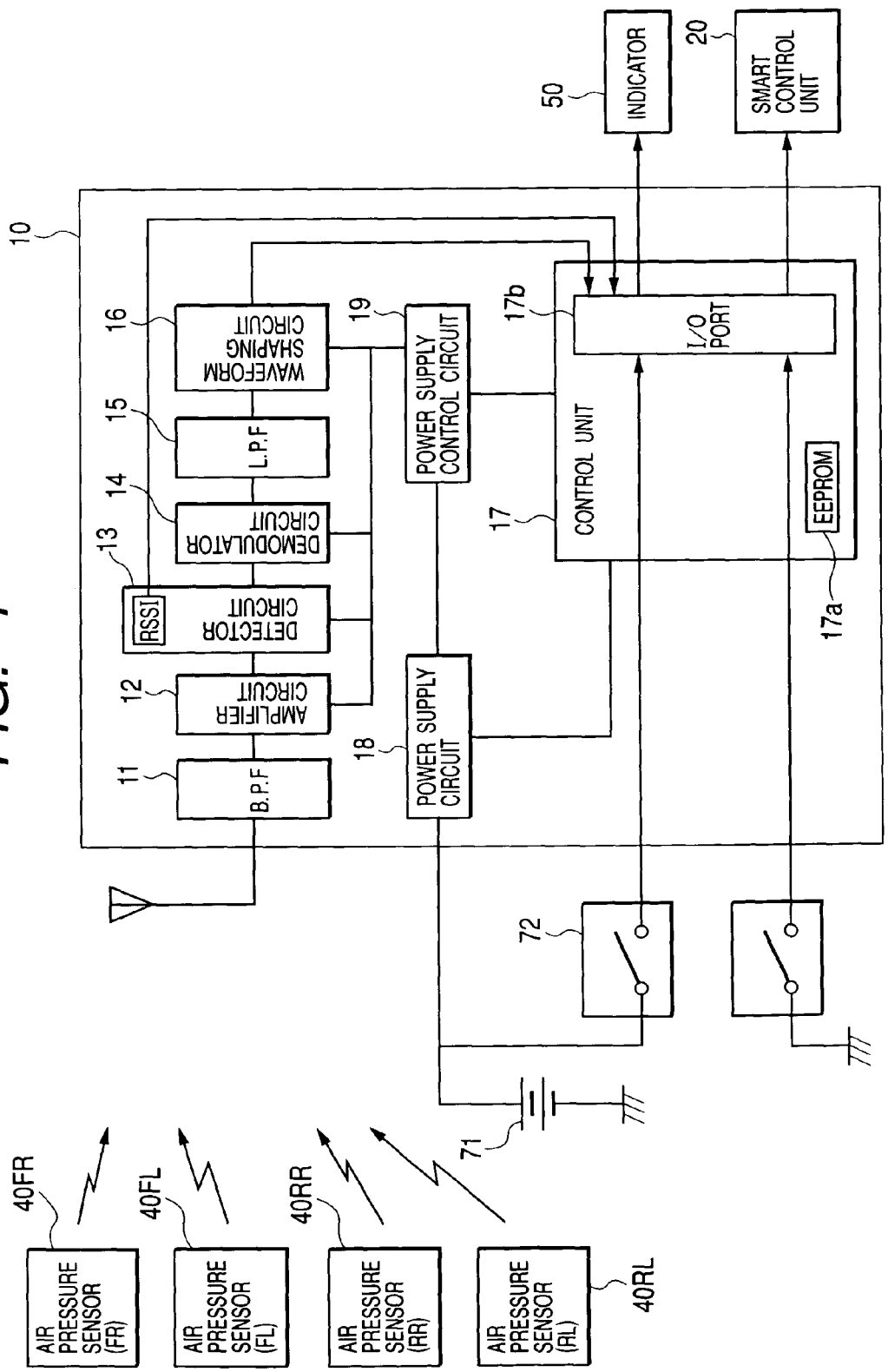
FIG. 4 is a block diagram showing a configuration of a receiving unit according to the first embodiment.

FIG. 4 is a block diagram schematically showing a configuration of the receiving unit 10 according to this embodiment. The receiving unit 10 is made up of a band pass filter 11, an amplifier circuit 12, a detector circuit 13, a demodulator circuit 14, a low pass filter 15, and a waveform shaping circuit 16, which provides a function to convert the electric wave received through the antenna 30 into a digital data processible in a control unit 17. The control unit 17 comprises a computer including a CPU, a ROM, RAM and others. In this connection, in particular, the control unit 17 is equipped with an EEPROM 17a for registration of air pressure sensor IDs. In this EEPROM 17a, each of the air pressure sensor identifications ("ID") is registered in a state paired with information for specifying a tire position. Moreover, in addition to these components, the receiving circuit 10 includes a power supply circuit 18 and a power supply control circuit 19 and is made to be put into activation upon receipt of power supply from a vehicle-mounted battery 71.

Still moreover, the control unit 17 is made to output control signals through an I/O port 17b to the indicator 50 and the smart control unit 20, and is made to receive a signal representative of a switching state of the ignition switch 72.

Figure 5:
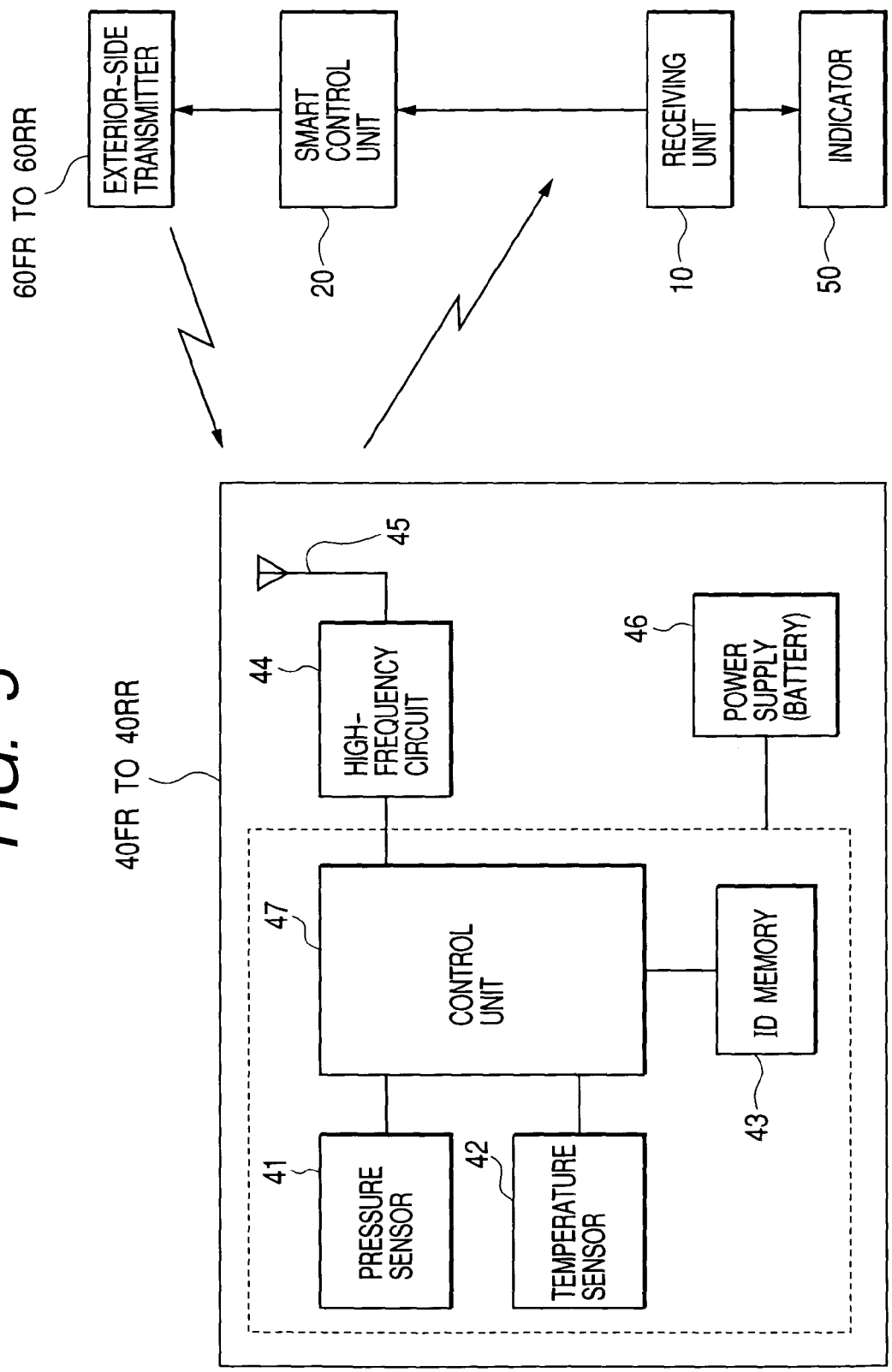
FIG. 5 is a block diagram showing a configuration of an air pressure sensor according to the first embodiment.

FIG. 5 is a block diagram schematically showing a configuration of each of the air pressure sensors 40FR to 40RL according to this embodiment. The air pressure sensors 40FR to 40RL have the same configuration, and each of the air pressure sensors 40FR to 40RL is composed of a pressure sensor 41 for detecting an air pressure in the interior of a tire, a temperature sensor 42 for detecting a temperature in the tire, an ID memory 43 for storing an ID in advance, a high-frequency circuit 44 for carrying out the radio transmission/reception, an antenna 45 for the radio transmission/reception, a power supply battery 46, and a control unit 47. The difference of this embodiment from the conventional system is that each of the air pressure sensors 40FR to 40RL is designed to carry out not only transmission but also reception.

Figure 6:
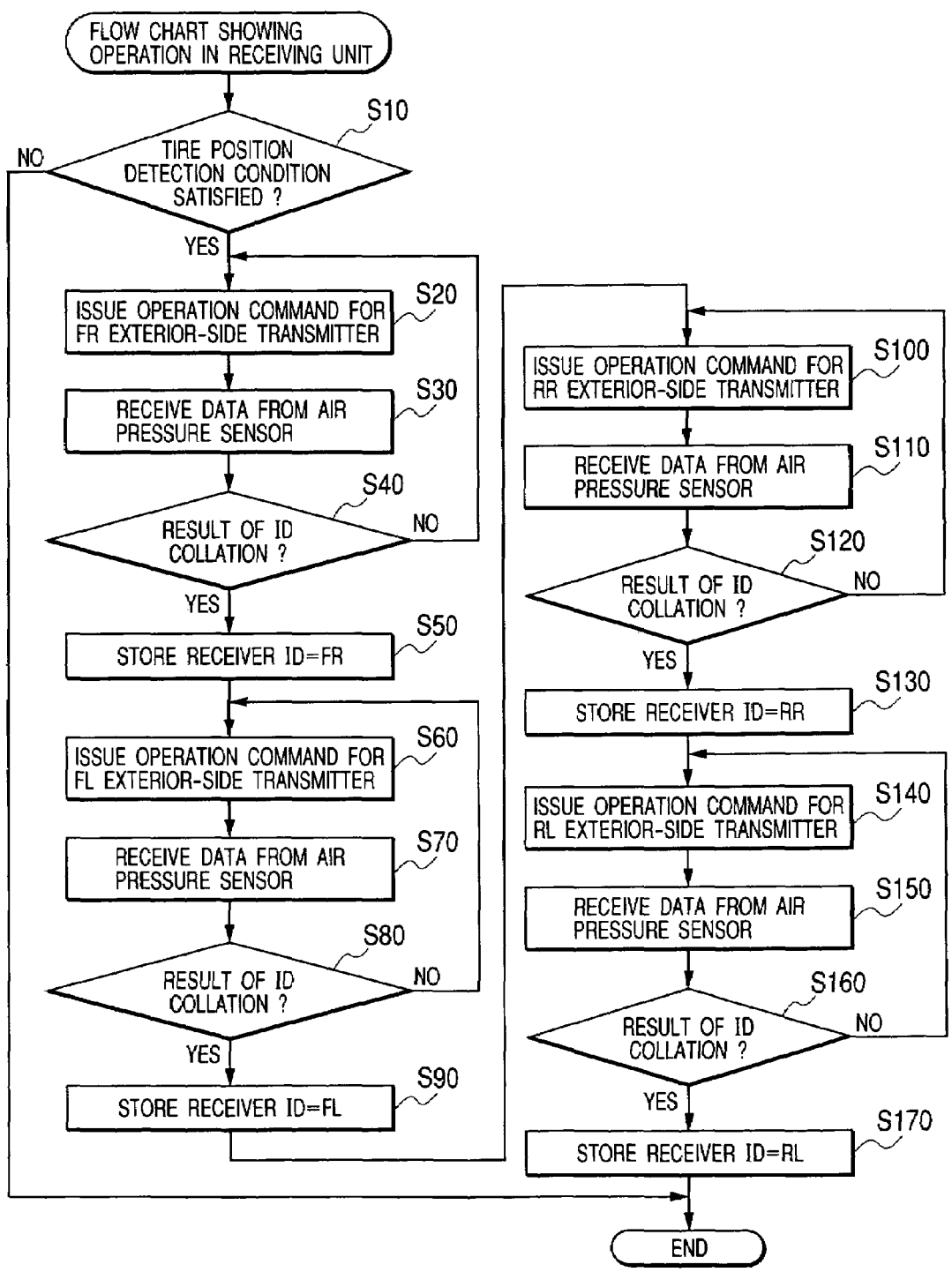
FIG. 6 is a flow chart showing the contents of control processing for identification ("ID") registration specifying tire positions, to be implemented in the receiving unit according to the first embodiment.

Secondly, referring to a flow chart of FIG. 6, a description will be given hereinbelow of the contents of ID registration processing to be implemented in this embodiment. This ID registration processing is executed in accordance with a program installed in the ROM of the control unit 17 of the receiving unit 10 in advance.

In the ID registration processing, a decision is made as to whether a tire position detection condition is satisfied or not (S10). In this case, according to this embodiment, the tire position detection condition is satisfied when the ignition switch 72 is manipulated from an OFF state to an ON state.

When the tire position detection condition reaches satisfaction (S10: YES), an operation command is issued to the smart control unit 20 so that the exterior-side transmitter 60FR of the front-right seat door transmits an ID transmission request to the air pressure sensor (S20) and, then, the reception processing is conducted with respect to the reply data returned from the air pressure sensor in response to the ID transmission request (S30). In this processing, a sensor ID is extracted from the data received through the antenna 30. After the sensor ID is extracted in this way, a collation is made as to whether or not the extracted ID agrees with one of the IDs registered in the EEPROM 17a in advance (S40).

In the EEPROM 17a, the IDs of the air pressure sensors of tires to be mounted on the vehicle are registered in advance. The first ID registration for this collation can be made in a manner such that the ID transmitted from the air pressure sensor of each of the tires is received by the receiving unit 10 and is written in the EEPROM 17a. This first ID registration does not always require specifying the tire position. This is because, if the ID registration processing according to this embodiment is conducted in shipping a vehicle, the ID registration is realizable in a state where the tire position is specified.

If the result of the ID collation shows that the ID received in the step S30 is from an air pressure sensor of a tire of this (his/her own) vehicle (S40: YES), the ID received in the step S30, together with added information for specifying that the ID pertains to the tire of the front-right wheel (FR) (tire position), is registered in the EEPROM 17a (S50).

When the ID registration for the front-right wheel reaches completion in this way, an operation command is then issued to the smart control unit 20 so that the exterior-side transmitter 60FL of the front-left seat door transmits an ID transmission request to an air pressure sensor (S60). The reception processing (S70) and the ID collation (S80) are implemented as in the case of the steps S30 and S40. If the result of the ID collation shows that the ID received in the step S70 pertains to the air pressure sensor of the tire of this vehicle (S80: YES), the ID received in the step S70, together with the added information indicative of the front-left wheel (FL), is registered in the EEPROM 17a (S90).

Moreover, an operation command for the transmission of an ID transmission request from the exterior-side transmitter 60RR of the rear-right door to an air pressure sensor is issued to the smart control unit 20 (S100). Subsequently, the reception processing (S110) and the ID collation (S120) are implemented as with the steps S30 and S40, and if the result of the ID collation shows that the ID received in the step S110 belongs to the air pressure sensor of the tire of this vehicle (S120: YES), the ID received in the step S110, together with added information indicative of the tire of the rear-right (RR), is registered in the EEPROM 17a.

Lastly, an operation command for the transmission of an ID transmission request from the exterior-side transmitter 60RL of the rear-left door to an air pressure sensor is issued to the smart control unit 20 (S140), and the reception processing (S150) and the ID collation (S160) are conducted and, if the result of the ID collation indicates that the ID received in the step S150 belongs to the air pressure sensor of the tire of this vehicle (S160: YES) the ID received in the step S150, together with added information representative of the tire of the rear-left wheel (RL), is registered in the EEPROM 17a (S170).

On the other hand, if the decision in any one of the steps S40, S80, S120 and S160 shows negative (NO), the operational flow returns to the step S20, S60, S100 or S140. Moreover, in carrying out the ID registration in each of the steps S50, S90, S130 and S170, the information previously registered in the EEPROM 17a is overwritten, or new ID registration is made after the already registered information on the same ID is made ineffective.

Figure 7:
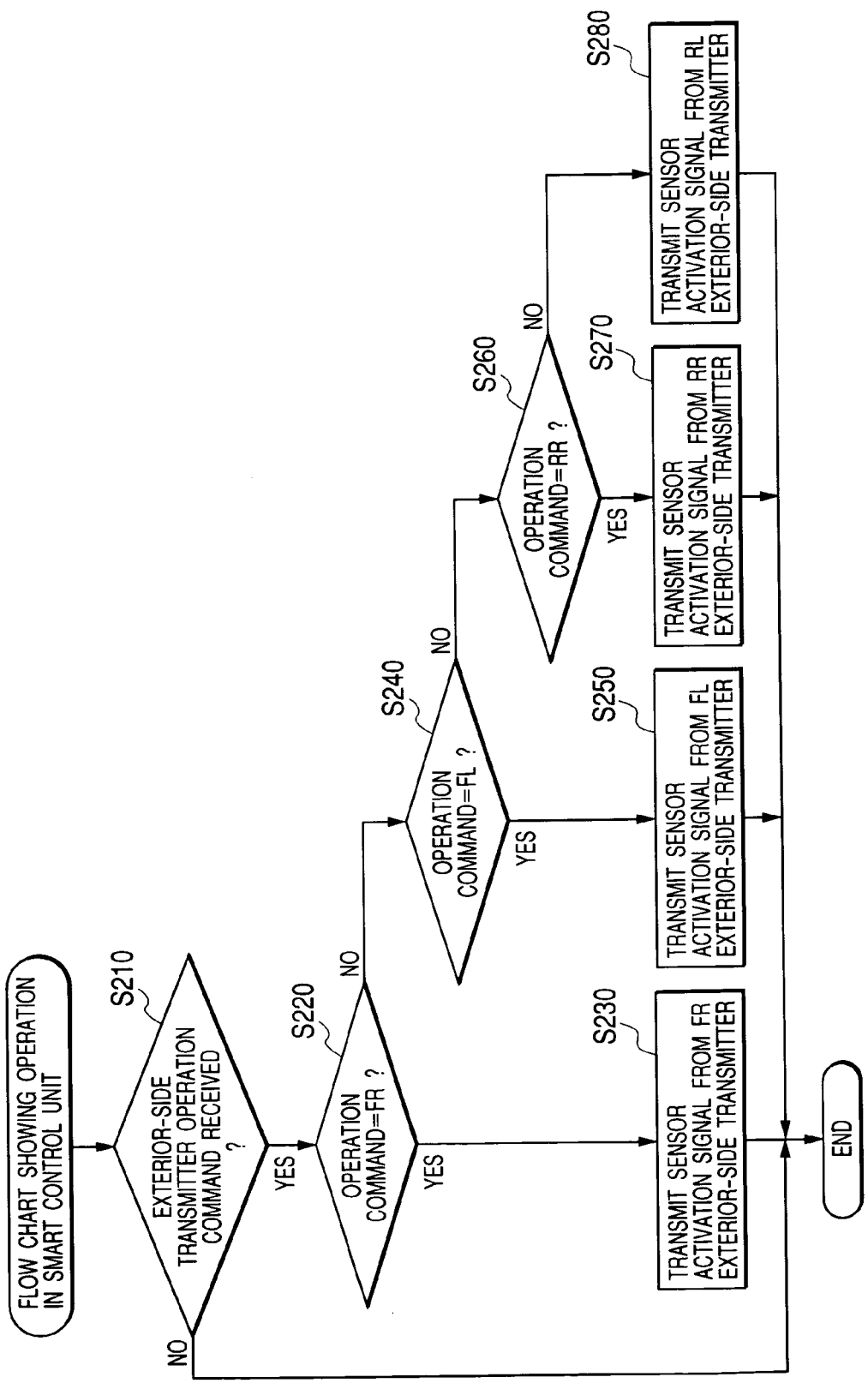
FIG. 7 is a flow chart showing the contents of control processing to be implemented in a smart control unit in conjunction with the control processing shown in FIG. 6.

The smart control unit 20 executes control processing shown in FIG. 7 in conjunction with the ID registration processing in the receiving unit 10. In this control processing, a decision is made as to whether the operation command for the exterior-side transmitters 60FR to 60RL is received or not (S210). In the case of the reception of the operation commands therefor (S210: YES), a decision is made as to whether or not the operation command is directed to the exterior-side transmitter 60FR of the front-right seat (FR seat) door (S220). If it is for the exterior-side transmitter 60FR of the FR seat door (S220: YES), a sensor activation signal is transmitted from the FR seat door exterior-side transmitter 60FR (S230). This sensor activation signal can be transmitted as a signal with the same carrier frequency as that in the normal smart control, or it can also be a signal with a frequency used for the communications in the tire air pressure monitoring system. The sensor activation signal is an ID transmission request in the present invention.

On the other hand, if the operation command received in the step S210 is not for the exterior-side transmitter 60FR of the front-right seat (FR seat) door (S220: NO), a decision is then made as to whether or not the operation command is directed to the exterior-side transmitter 60FL of the front-left seat (FL seat) door (S240). If it is for the exterior-side transmitter 60FL of the FL seat door (S240: YES), a sensor activation signal is transmitted from the FL seat exterior-side transmitter 60FL (S250). On the other hand, if the operation command received in the step S210 is not for the exterior-side transmitter 60FL of the front-left seat (FL seat) door (S240: NO), a decision is made as to whether or not the operation command is for the exterior-side transmitter 60RR of the rear-right seat (RR seat) door (S260). If it is for the exterior-side transmitter 60RR of the RR seat door (S260: YES), a sensor activation signal is transmitted from the RR seat exterior-side transmitter 60RR (S270). If the operation command received in the step S210 is other than the FR seat, the FL seat and the RR seat (S220: N0, S240: N0, S260: NO), a sensor activation signal is transmitted from the exterior-side transmitter 60RL of the rear-left (RL seat) door (S290).

Figure 8:
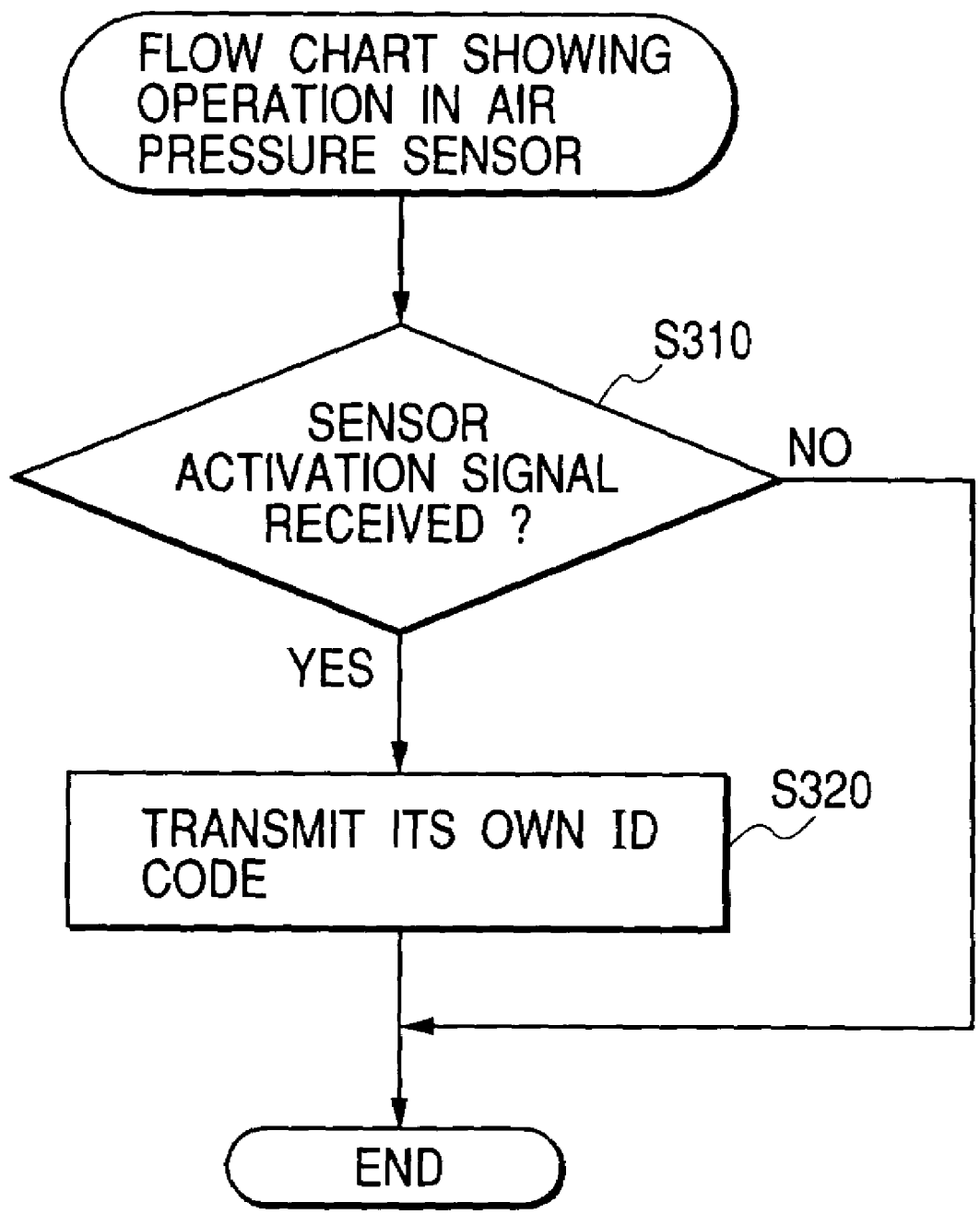
FIG. 8 is a flow chart showing the contents of control processing to be implemented in the air pressure sensor in conjunction with the control processing shown in FIGS. 6 and 7.

Furthermore, referring to a flow chart of FIG. 8, a description will be given hereinbelow of the contents of processing to be implemented in each of the air pressure sensors 40FR to 40RL in conjunction with the ID registration processing in the receiving unit 10.

When receiving a sensor activation signal (S310: YES), each of the air pressure sensors 40FR to 40RL is made to execute processing (S320) to transmit its own ID code. In this case, for transmitting its own ID in the step S320, a dedicated communication format is used, or a communication method in which a bit is placed at the end of data to be transmitted is employed, in order to distinguish from a case of transmitting air pressure detection data in the normal processing. On the other hand, in the case of no reception of a sensor activation signal at the time of the implementation of this routine (S310: NO), the operational flow goes to the normal processing, that is, the monitoring of a tire air pressure, a temperature and others, and the transmission of detection data at a predetermined time interval.

As a result of the employment of the above-described configuration, according to this embodiment, there is no need to conduct a special operation for registering the air pressure sensor ID while specifying the tire position after the implementation of rotation, and when a change of the ignition switch takes place from an OFF state to an ON state, the registration can be accomplished automatically. This can considerably reduce the manpower as compared to the conventional technique. Moreover, since the exterior-side transmitters for the smart entry are used for this ID registration, in the case of a vehicle equipped with a smart control function, there is no need to use new equipment additionally.

Still moreover, since the collation with the previously (already) registered ID is made at the ID registration, mistaken registration does not occur due to the interference with data transmitted from an air pressure sensor of another vehicle. In addition, since, in an air pressure sensor, a format different from that for the transmission of the normal air pressure detection data is employed when its own ID is transmitted in response to an activation signal from an exterior-side transmitter, there exists no problem of the registration involving wrong tire position being made due to the interference with data transmitted from an air pressure sensor of another tire of this vehicle. Still additionally, since the previously registered is overwritten in registering an ID, it is possible to prevent an indication from being made in error in the tire air pressure monitoring processing on the basis of the registered information prior to the rotation.

Figure 9:
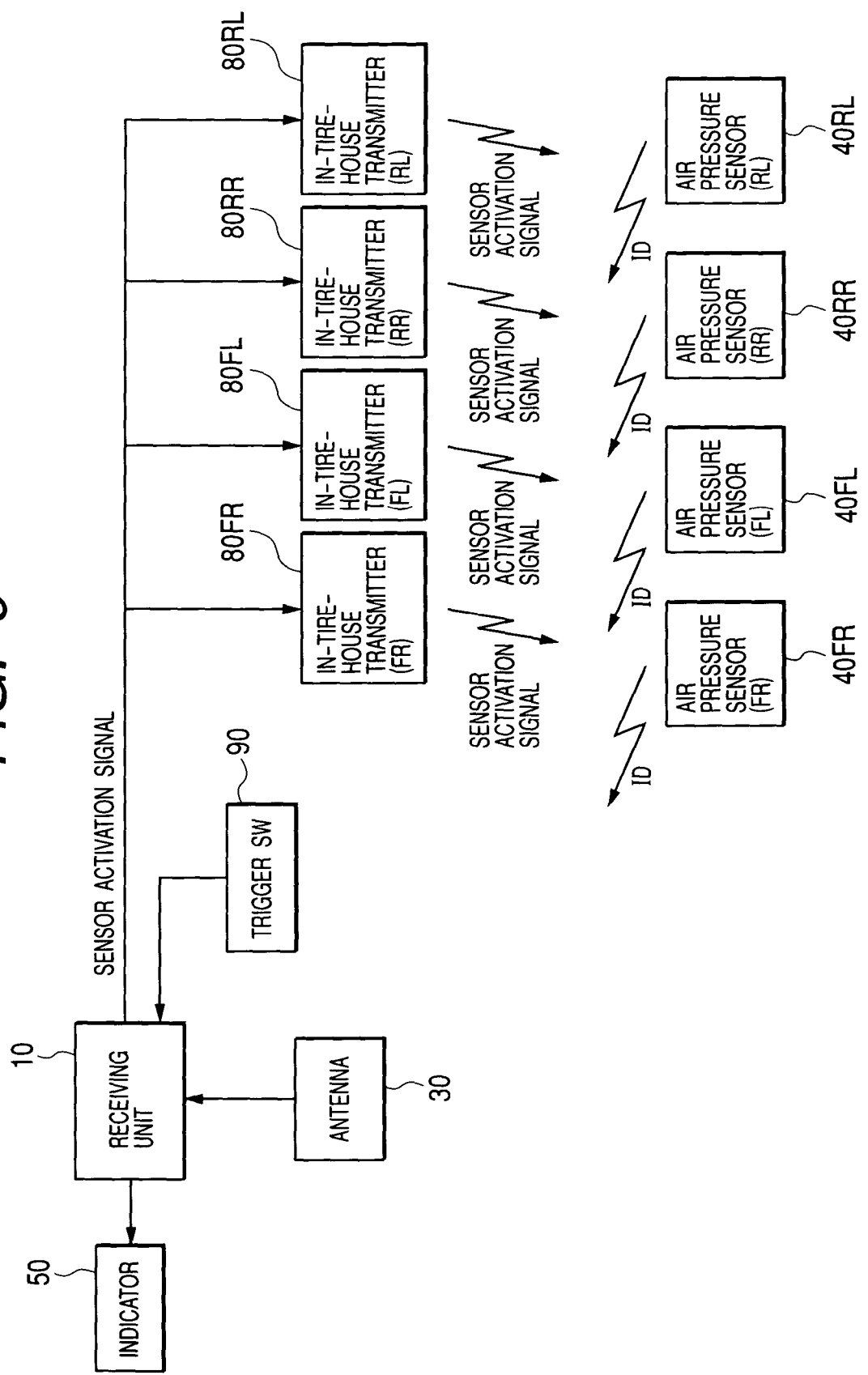
FIG. 9 is a block diagram showing a configuration of a tire air pressure monitoring system according to a second embodiment of the present invention.

Secondly, a description will be given hereinbelow of a tire air pressure monitoring system according to a second embodiment of the present invention. As shown in FIG. 9, the tire air pressure monitoring system according to the second embodiment is made up of a receiving unit 10, a receiving antenna 30, transmitting antennas 80FR, 80FL, 80RR and 80RL placed in tire houses, air pressure sensors 40FR, 40FL, 40RR and 40RL mounted on tires, and an indicator 50 for indicating a result of the air pressure monitoring control in the receiving unit 10. Each of the transmitting antennas 80FR to 80RL is made to perform transmission within only a limited transmission area so as not to place tires other than the tire in the corresponding tire house in the transmission area. Moreover, in this embodiment, the antennas 80FR to 80RL serve as the transmitters in the present invention. This embodiment is similar to the above-described first embodiment except that a trigger switch 90 is provided in the receiving unit 10 to generate a trigger for the ID registration. The air pressure sensors 40FR to 40RL are the same as those in the first embodiment.

Figure 10:
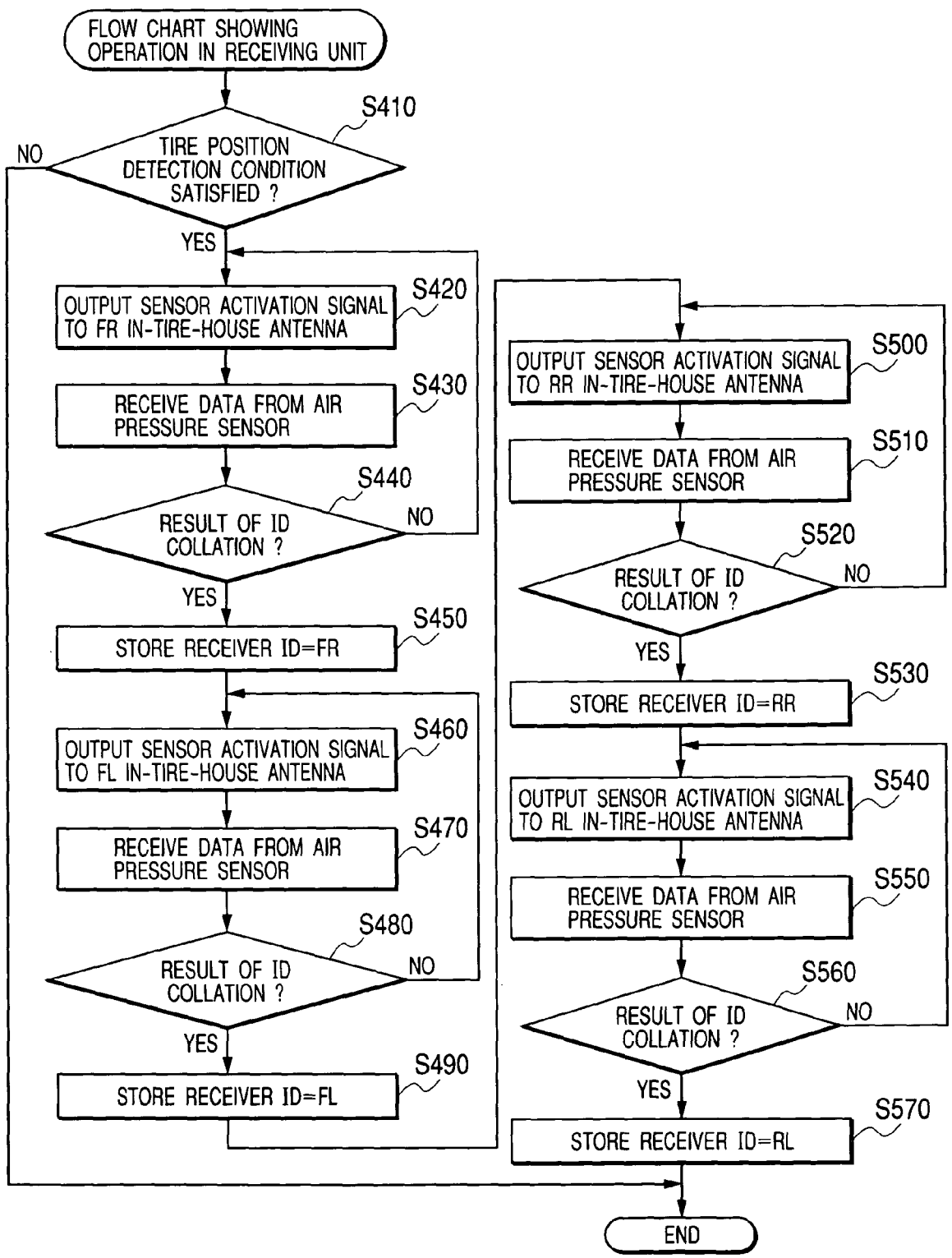
FIG. 10 is a flow chart showing the contents of control processing for ID registration specifying tire positions, to be implemented in a receiving unit according to the second embodiment.

In the second embodiment, the receiving unit 10 is designed to accomplish the ID registration by implementing the control processing shown in a flow chart of FIG. 10. This control processing starts when the trigger switch 50 comes into a turn-on state (S410: YES), and a sensor activation signal serving as an ID transmission request to an air pressure sensor is outputted to the antenna 80FR in the tire house for the front-right wheel (S420), then followed by ID data reception processing (S430). Subsequently, a collation is made as to whether or not the ID data received in the step S430 agrees with any one of the IDs registered in the EEPROM 17a in advance (S440).

If the result of the ID collation shows that the ID data pertains to an air pressure sensor of a tire of this vehicle (S440: YES), the ID received this time, together with added information to be used for specifying that the received ID pertains to the tire of the front-right wheel (FR), is registered in the EEPROM 17a (S450). Following this, the ID transmission requests are transmitted in the order of the antenna 80FL in the front-left wheel tire house, the antenna 80RR in the rear-right wheel tire house and the antenna 80RL of the rear-left wheel tire house (S460, S500, S540), and after each of these operations, each of the reception processing (S470, S510, S550) and each of the ID collation processing (S480, S520, S560) are implemented, and in a state where the corresponding tire position is specified on the basis of the relationship with the corresponding transmitter which has transmitted the sensor activation signal, the ID received as a reply to the sensor activation signal, together with added information indicative of the tire position, is registered in the EEPROM 17a (S490, S530, S570).

Each of the air pressure sensors 40FR to 40RL conducts the processing similar to that in the above-described first embodiment, that is, it receives a sensor activation signal from the corresponding transmitter 80FR, 80FL, 80RR or 80RL and transmits its own ID code through the use of a format different from that for the normal processing.

This second embodiment can also offer the effects similar to those of the first embodiment.

It should be understood that the present invention is not limited to the above-described embodiments, and that it is intended to cover all changes and modifications of the embodiments of the invention herein which do not constitute departures from the spirit and scope of the invention.

For example, as the ID registration processing starting condition, it is also appropriate that the ID registration is made once every predetermined number of times of ON state of the ignition switch, or that the ID registration processing is implemented at a constant time interval in accordance with a program.

Figure 11:
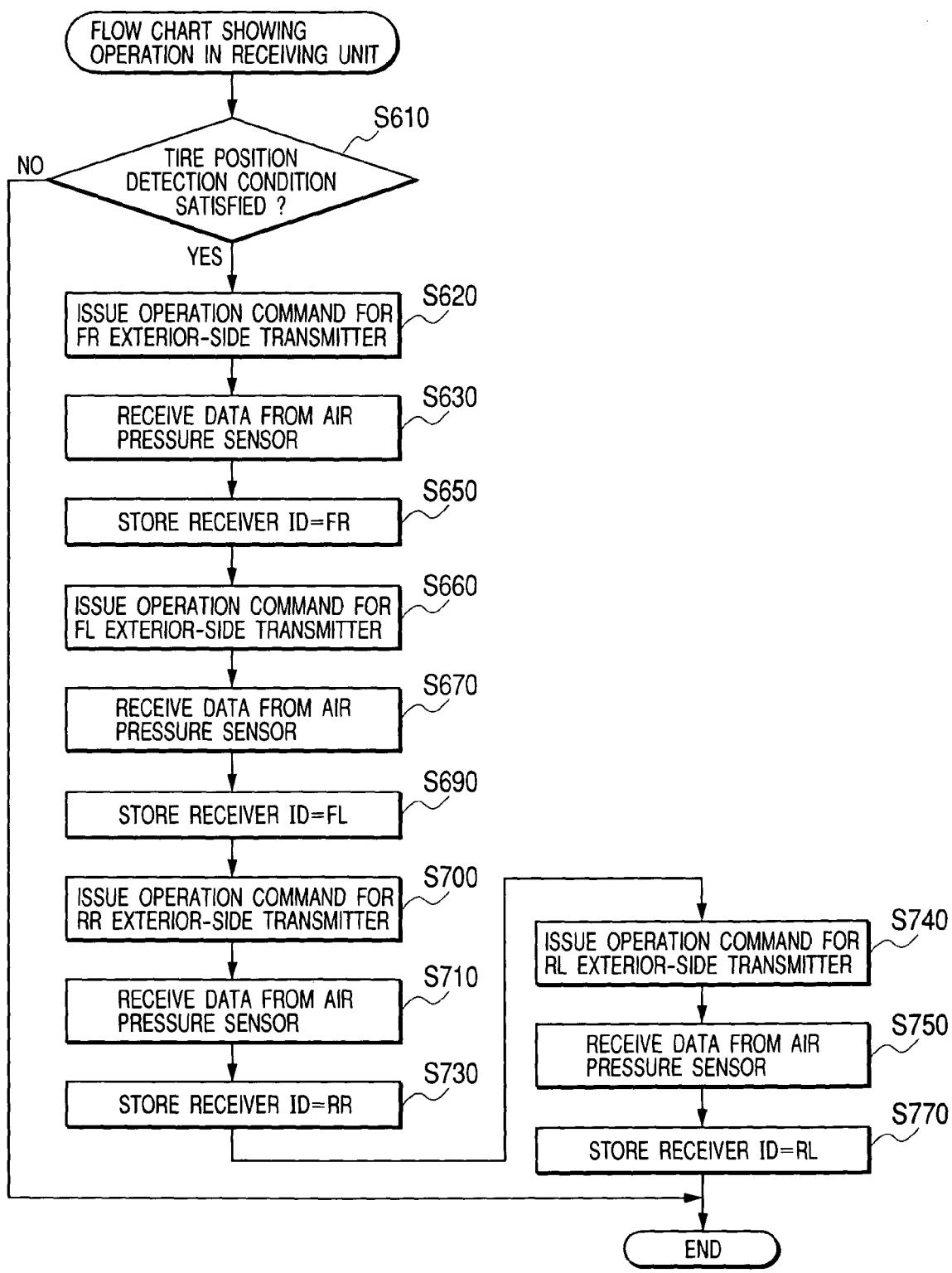
FIG. 11 is a flow chart showing the contents of control processing for ID registration specifying tire positions, to be implemented in a receiving unit according to a modification of the embodiment of the present invention.

In addition, the ID collation processing described in the first and second embodiment is omissible in the present invention. That is, it is also appropriate that, as shown in FIG. 11, when a tire position detection condition is satisfied (S610: YES), an operation command is issued to the smart control unit 20 for the transmission of a sensor activation signal from the front-right seat door exterior-side transmitter 60FR (S620), and when an ID is received (S630: YES), it is registered as an ID of a sensor at the FR position (S650) and, subsequently, operation commands for the transmission of sensor activation signals are issued in the order of the front-left seat door exterior-side transmitter 60FL, the rear-right seat door exterior-side transmitter 60RR and the rear-left seat door exterior-side transmitter 60RL (S660, S700, S740) and, following this, the reception processing are conducted (S670, S710, S750) so that each of the IDs received as replies to the sensor activation signals are registered in a state where the corresponding tire position is specified on the basis of the relationship with the transmitter which has transmitted the corresponding sensor activation signal (S690, S730, S770). This is because each transmitter for the transmission of a sensor activation signal is made to transmit the sensor activation signal within only a limited area and, hence, it can be considered that the problem of the mistaken registration due to the interference becomes little. Moreover, if the air pressure sensor is made to return its own ID through the use of a data format different from that for the ID transmission in the normal processing at the time of the reply to the sensor activation signal, the problem of the mistaken registration stemming from the interference is sufficiently avoidable.

In addition, if a sensor activation signal is constructed to include data whereby the position of a transmitter is identifiable and this sensor activation signal and an ID are returned in a state paired with each other, it is also possible that the received data is directly registered in a memory. This is because the employment of a different format from the normal can prevent the ID data returned from the air pressure sensor which has received the sensor activation signal from being taken for the ID data transmitted in the normal processing of the air pressure sensor.

Conversely, it is also acceptable that the air pressure sensor which has received the sensor activation signal is made to transmit its own ID in the same way as the ID transmission in the normal processing. This is because the collation with the already registered ID can prevent the interference with an ID of another vehicle. In this connection, as a method of preventing the interference with an ID transmitted from another sensor of this vehicle in the normal processing, for example, there is a manner of checking whether or not the elapsed time from the previous reception of the ID agree with the ID transmission interval in the normal processing. This easily prevents the radio interference therewith.

What is claimed is:

1. A sensor identification registration method of registering an identification of a plurality of air pressure sensors mounted on respective tires of a vehicle in a memory in a state where a position of the tire is identifiable, said air pressure sensor being equipped with a reception function and a plurality of transmitters being provided on a body of said vehicle, each of said transmitters being made to encompass only one of the tires in its transmission area, said method comprising:

a transmission step in which one of said plurality of transmitters provided on said vehicle body transmits an identification transmission request to one of said air pressure sensors, the one of said air pressure sensors existing in the transmission area corresponding to one of the transmitters and including transmission/reception means for transmission of an identification of the one of said air pressure sensors, and the one of said air pressure sensors transmits its own identification in response to an identification transmission request transmitted from one of said transmitters;

a reception step in which a receiver of said vehicle body receives said identification transmitted from the one of said air pressure sensors in said transmission step; and a registration step in which said identification received in said reception step is registered in said memory while specifying the tire position in relation to said transmitter which has transmitted said identification transmission request.

2. A sensor identification registration method of registering an identification of a plurality of air pressure sensors mounted on respective tires of a vehicle in a memory in a state where a position of the tire is identifiable, with said air pressure sensor being equipped with a reception function, said method comprising:

a transmission step in which one of a plurality of transmitters disposed on doors of said vehicle for smart control transmits an identification transmission request to one of said air pressure sensors, the one of said air pressure sensors existing in the transmission area corresponding to one of the transmitters and including transmission/reception means for transmission of an identification of the one of said air pressure sensors, and the one of said air pressure sensors transmits its own identification in response to said identification transmission request transmitted from the one of said transmitters;

a reception step in which a receiver of a body of said vehicle receives said identification transmitted from the one of said air pressure sensors in said transmission step; and a registration step in which said identification received in said reception step is registered in said memory while specifying the tire position in relation to said transmitter which has transmitted said identification transmission request.

3. The method according to claim 1, wherein each of said steps is repeatedly implemented while said transmitters are rotated to transmit said identification transmission requests in turn so that said identifications related to all said tires are registered in said memory.

4. The method according to claim 2, wherein each of said steps is repeatedly implemented while said transmitters are rotated to transmit said identification transmission requests in turn so that said identifications related to all said tires are registered in said memory.

5. The method according to claim 1, wherein said identifications of said air pressure sensors of the tires of his/her own vehicle are registered in said memory in advance and said identification received from said air pressure sensor in response to said identification transmission request is collated with the registration contents in said memory to confirm that the received identification pertains to said air pressure sensor of the tire of his/her own vehicle and, after the confirmation thereof, the identification registration is made to specify the tire position.

6. The method according to claim 2, wherein said identifications of said air pressure sensors of the tires of his/her own vehicle are registered in said memory in advance and said identification received from said air pressure sensor in response to said identification transmission request is collated with the registration contents in said memory to confirm that the received identification pertains to said air pressure sensor of the tire of his/her own vehicle and, after the confirmation thereof, the identification registration is made to specify the tire position.

7. The method according to claim 1, wherein said air pressure sensor is made to transmit its own identification in a manner that involves identifying a reply made with respect to said identification transmission request.

8. The method according to claim 2, wherein said air pressure sensor is made to transmit its own identification in a manner that involves identifying a reply made with respect to said identification transmission request.

9. The method according to claim 1, wherein, when an identification is already registered in said memory in the form of specifying the tire position, the identification registration is made by overwriting the already registered information.

10. The method according to claim 2, wherein, when an identification is already registered in said memory in the form of specifying the tire position, the identification registration is made by overwriting the already registered information.

11. The method according to claim 1, wherein each of said steps is implemented in response to a predetermined trigger.

12. The method according to claim 2, wherein each of said steps is implemented in response to a predetermined trigger.

13. The method according to claim 1, wherein each of said steps is implemented when an ignition switch of said vehicle shows a variation in state.

14. The method according to claim 2, wherein each of said steps is implemented when an ignition switch of said vehicle shows a variation in state.

15. A tire air pressure sensor identification registration system which is made to register an identification of a plurality of air pressure sensors mounted on respective tires of a vehicle in a memory in a state where a position of the tire is identifiable, with said air pressure sensor being equipped with a reception function, said system comprising:

a plurality of transmitters provided in a body of said vehicle, each of said transmitters being made to encompass only one of the tires in its transmission area, and one of said transmitters being put into operation by transmitter operating means for transmitting an identification transmission request to the one of said air pressure sensors, the one of said air pressure sensors existing in the transmission area corresponding to one of the transmitters for transmission of an identification of the one of said air pressure sensors;

transmission/reception means provided in the one of said air pressure sensors for transmitting said identification of the one of said air pressure sensors in response to said identification transmission request transmitted from the one of said transmitters;

a receiver provided in said vehicle body for receiving said identification transmitted from the one of said air pressure sensors;

identification registration means for registering said identification received by said receiver in said memory while specifying the tire position on the basis of the relationship with said transmitter put into operation by said transmitter operating means.

16. A tire air pressure sensor identification registration system which is made to register an identification of a plurality of air pressure sensors mounted on respective tires of a vehicle in a memory in a state where a position of the tire is identifiable, with said air pressure sensor being equipped with a reception function, said system comprising:

transmitters for smart control provided on doors of said vehicle, each of said transmitters being made to encompass only one of the tires in its transmission area, and one of said transmitters being put into operation by transmitter operating means for transmitting an identification transmission reciuest to the one of said air pressure sensors, the one of said air pressure sensors existing in the transmission area corresponding to one of the transmitters for transmission of an identification of the one of said air pressure sensors;

transmission/reception means provided in the one of said air pressure sensors for transmitting said identification of the one of said air pressure sensors in response to said identification transmission request transmitted from the one of said transmitters;

a receiver provided in a body of said vehicle for receiving said identification transmitted from one of said air pressure sensors;

transmitter operating means for making one of said transmitters transmit an identification transmission request; and identification registration means for registering said identification received by said receiver in said memory while specifying the tire position on the basis of the relationship with said transmitter put into operation by said transmitter operating means.

17. The system according to claim 15, wherein said transmitter operating means is constructed as means for, when the identification registration for one air pressure sensor in said identification registration means reaches completion, making the next transmitter transmit an identification transmission request, and said identification registration means is constructed as means for implementing the identification registration whenever said transmitter operating means is put into activation.

18. The system according to claim 16, wherein said transmitter operating means is constructed as means for, when the identification registration for one air pressure sensor in said identification registration means reaches completion, making the next transmitter transmit an identification transmission request, and said identification registration means is constructed as means for implementing the identification registration whenever said transmitter operating means is put into activation.

19. The system according to claim 15, wherein said identifications of said air pressure sensors of the tires of his/her own vehicle are registered in said memory in advance, and said system further comprises identification collation means for collating said identification received from said air pressure sensor in response to said identification transmission request with the registration contents in said memory to confirm that the received identification is an identification of an air pressure sensor of a tire of his/her own vehicle, and said identification registration means implements the identification registration when said identification collation means confirms that the received identification is the air pressure sensor identification of the tire of his/her own vehicle.

20. The system according to claim 16, wherein said identifications of said air pressure sensors of the tires of his/her own vehicle are registered in said memory in advance, and said system further comprises identification collation means for collating said identification received from said air pressure sensor in response to said identification transmission request with the registration contents in said memory to confirm that the received identification is an identification of an air pressure sensor of a tire of his/her own vehicle, and said identification registration means implements the identification registration when said identification collation means confirms that the received identification is the air pressure sensor identification of the tire of his/her own vehicle.

21. The system according to claim 15, wherein said air pressure sensor includes registration identification transmission means for transmitting its own identification in a manner that involves identifying a reply made with respect to an identification transmission request.

22. The system according to claim 16, wherein said air pressure sensor includes registration identification transmission means for transmitting its own identification in a manner that involves identifying a reply made with respect to an identification transmission request.

23. The system according to claim 15, wherein, when an identification is already registered in said memory in the form of specifying the tire position, the identification registration is made by overwriting the already registered information.

24. The system according to claim 16, wherein, when an identification is already registered in said memory in the form of specifying the tire position, the identification registration is made by overwriting the already registered information.

25. The system according to claim 15, wherein said transmitter operating means is put into activation in response to a predetermined trigger.

26. The system according to claim 16, wherein said transmitter operating means is put into activation in response to a predetermined trigger.

27. The system according to claim 15, wherein said transmitter operating means is put into activation when an ignition switch shows a variation in state.

28. The system according to claim 16, wherein said transmitter operating means is put into activation when an ignition switch shows a variation in state.

29. A tire air pressure monitoring system comprising:

air pressure sensors each provided on respective tires of a vehicle for transmitting its own identification together with air pressure detection data;

a memory for registering said identification of each of said air pressure sensors while specifying a position of each of the tires;

a receiver provided in a body of said vehicle for receiving said air pressure detection data and said identification transmitted from said air pressure sensor; and a control unit for collating said identification received together with said air pressure detection data with the registration contents in said memory to specify said air pressure sensor of his/her own vehicle the received air pressure detection data pertains to and, when detecting a tire which shows abnormality in air pressure, making an alarm indication on the specified tire, with said air pressure sensors being equipped with a reception function, said monitoring system comprising:

a plurality of transmitters provided in said vehicle body, each of said transmitters being made to encompass only one of the tires in its transmission area, one of said transmitters being put into operation by transmitter operating means for transmitting an identification transmission request to the one of said air pressure sensors, the one of said air pressure sensors existing in the transmission area corresponding to one of the transmitters for transmission of an identification of the one of said air pressure sensors;

transmission/reception means provided in the one of said air pressure sensors for transmitting said identification of the one of said air pressure sensors in response to said identification transmission request transmitted from the one of said transmitters;

identification registration means for registering said identification received by said receiver in said memory while specifying the tire position on the basis of the relationship with said transmitter put into activation by said transmitter operating means.

30. A tire air pressure monitoring system comprising: air pressure sensors each provided on respective tires of a vehicle for transmitting its own identification together with air pressure detection data;
- a memory for registering said identification of each of said air pressure sensors while specifying a position of each of the tires;
- a receiver provided in a body of said vehicle for receiving said air pressure detection data and said identification transmitted from said air pressure sensor; and
- a control unit for collating said identification received together with said air pressure detection data with the registration contents in said memory to specify said air pressure sensor of his/her own vehicle the received air pressure detection data pertains to and, when detecting a tire which shows abnormality in air pressure, making an alarm indication on the specified tire, with said air pressure sensors being equipped with a reception function, said monitoring system comprising:
- transmitters for smart control provided on doors of said vehicle, one of said transmitters being put into operation by transmitter operating means for transmitting an identification transmission request to the one of said air pressure sensors, the one of said air pressures sensors existing in the transmission area corresponding to one of the transmitters for transmission of an identification of the one of said air pressure sensors;
- transmission/reception means provided in the one of said air pressure sensors for transmitting said identification of the one of said air pressure sensors in response to said identification transmission request transmitted from the one of said transmitters; and
- identification registration means for registering said identification received by said receiver in said memory while specifying the tire position on the basis of the relationship with said transmitter put into activation by said transmitter operating means.

31. The system according to claim 30, wherein said transmitter operating means includes operation command outputting means for outputting a predetermined command designating a transmitter to be operated with respect to a smart control system for controlling said transmitter, and said transmitter operating means is constructed as means for making the transmission of said identification transmission request by outputting said predetermined command to said smart control system through the use of the operation command outputting means.

32. The system according to claim 29, wherein said transmitter operating means is constructed as means for, when the identification registration for one air pressure sensor in said identification registration means reaches completion, making the next transmitter transmit an identification transmission request, and said identification registration means is constructed as means for implementing the identification registration whenever said transmitter operating means is put into activation.

33. The system according to claim 30, wherein said transmitter operating means is constructed as means for, when the identification registration for one air pressure sensor in said identification registration means reaches completion, making the next transmitter transmit an identification transmission request, and said identification registration means is constructed as means for implementing the identification registration whenever said transmitter operating means is put into activation.

34. The system according to claim 29, wherein said identifications of said air pressure sensors of the tires of his/her own vehicle are registered in said memory in advance, and said system further comprises identification collation means for collating said identification received from said air pressure sensor in response to said identification transmission request with the registration contents in said memory to confirm that the received identification is an identification of an air pressure sensor of a tire of his/her own vehicle, and said identification registration means implements the identification registration when said identification collation means confirms that the received identification is the air pressure sensor identification of the tire of his/her own vehicle.

35. The system according to claim 30, wherein said identifications of said air pressure sensors of the tires of his/her own vehicle are registered in said memory in advance, and said system further comprises identification collation means for collating said identification received from said air pressure sensor in response to said identification transmission request with the registration contents in said memory to confirm that the received identification is an identification of an air pressure sensor of a tire of his/her own vehicle, and said identification registration means implements the identification registration when said identification collation means confirms that the received identification is the air pressure sensor identification of the tire of his/her own vehicle.

36. The system according to claim 29, wherein said air pressure sensor includes registration identification transmission means for transmitting its own identification in a manner that involves identifying a reply made with respect to an identification transmission request.

37. The system according to claim 30, wherein said air pressure sensor includes registration identification transmission means for transmitting its own identification in a manner that involves identifying a reply made with respect to an identification transmission request.

38. The system according to claim 29, wherein said identification registration means is constructed as means for, when an identification is already registered in the memory in the form of specifying the tire position, making the identification registration by overwriting the already registered information.

39. The system according to claim 30, wherein said identification registration means is constructed as means for, when an identification is already registered in the memory in the form of specifying the tire position, making the identification registration by overwriting the already registered information.

40. The system according to claim 29, wherein said transmitter operating means is put into activation in response to a predetermined trigger.

41. The system according to claim 30, wherein said transmitter operating means is put into activation in response to a predetermined trigger.

42. The system according to claim 29, wherein said transmitter operating means is put into activation when an ignition switch shows a variation in state.

43. The system according to claim 30, wherein said transmitter operating means is put into activation when an ignition switch shows a variation in state.

* * * * *